(No Model.)  2 Sheets—Sheet 1.

E. MEYERS.
MILLING MACHINE.

No. 517,287.  Patented Mar. 27, 1894.

WITNESSES:  
Henry J. Miller  
Chas. H. Luther Jr.

INVENTOR:  
Ernest Meyers  
by Joseph A. Miller & Co.  
Attys.

THE NATIONAL LITHOGRAPHING COMPANY,
WASHINGTON, D. C.

(No Model.) 2 Sheets—Sheet 2.

E. MEYERS.
MILLING MACHINE.

No. 517,287. Patented Mar. 27, 1894.

WITNESSES:
Henry J. Miller
Chas. H. Luther Jr.

INVENTOR:
Ernest Meyers
by Joseph A. Miller & Co.
Attys.

UNITED STATES PATENT OFFICE.

ERNEST MEYERS, OF TAUNTON, MASSACHUSETTS.

MILLING-MACHINE.

SPECIFICATION forming part of Letters Patent No. 517,287, dated March 27, 1894.

Application filed July 5, 1893. Serial No. 479,665. (No model.)

*To all whom it may concern:*

Be it known that I, ERNEST MEYERS, of Taunton, in the county of Bristol and State of Massachusetts, have invented a new and useful Improvement in Milling-Machines; and I hereby declare that the following is a full, clear, and exact description of the same, reference being had to the accompanying drawings, forming part of this specification.

This invention has reference to improvements in milling-machines adapted to mill dies, or other irregular surfaces, from a pattern, on an enlarged or a reduced scale,—such a machine being shown and described in United States Patent No. 453,018, granted to me May 26, 1891.

The object of the invention is to secure greater accuracy in the adjustment and operation of the machine, to secure greater stability of the milling-tool, and to improve the quality of the work.

In the patented machine the stylus, or tracer, as well as the milling-cutter was supported on a bar pivotally secured at one end to a bracket, which bracket was horizontally pivoted at one side of the bar, and the stylus, as well as the milling-tool, was also placed on one side of the bar, while the pivotal connection of the transverse moving-end of the bar with the traversing carriage was in the center of the bar.

In my improved machine I use a slotted way pivoted at both ends on the center line of the way, on this way I support the carriages carrying the stylus and the milling tool, or tools, so that the axes of these, as well as the axes of the pivots, are all on the center line of the slotted-bar or way.

My present invention consists in the improved construction above indicated, in the improved construction of the traversing-mechanism, and other parts more fully set forth hereinafter.

Figure 1:
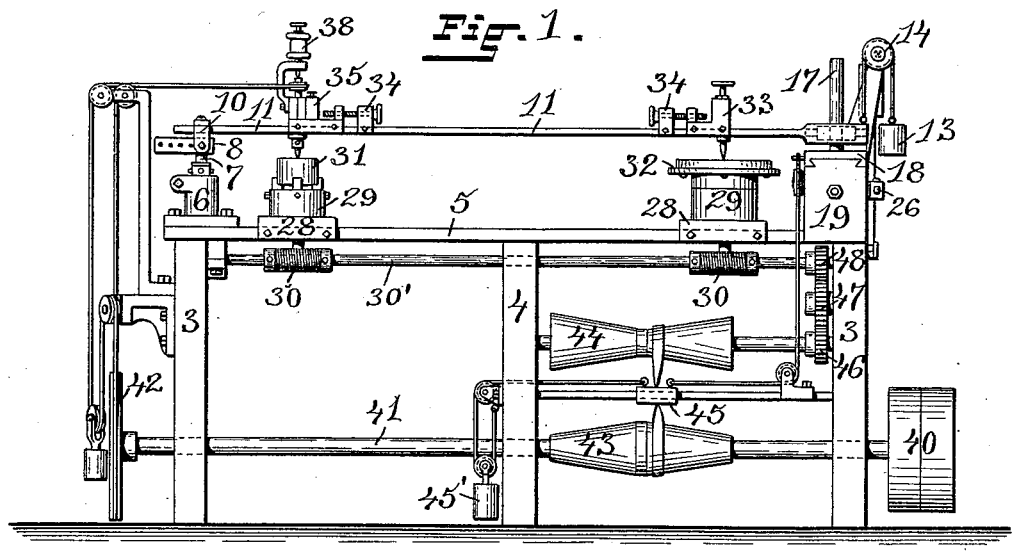
Figure 2:
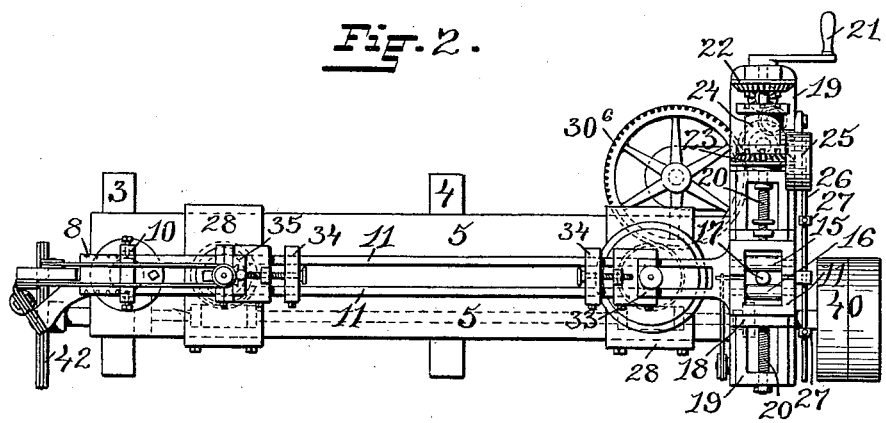
Figure 3:
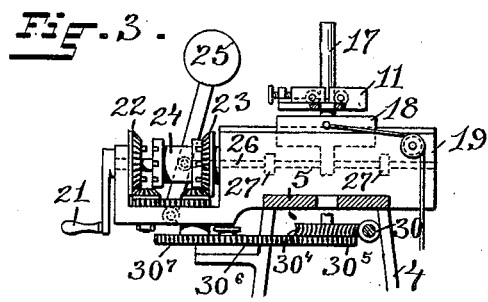
Figure 4:
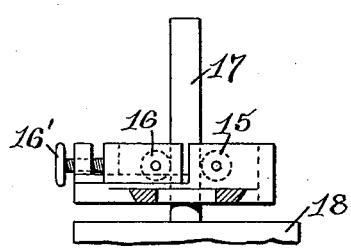
Figure 5:
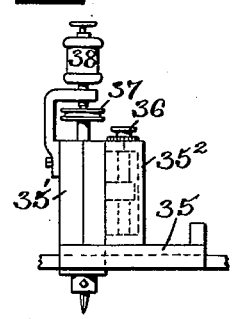
Figure 6:
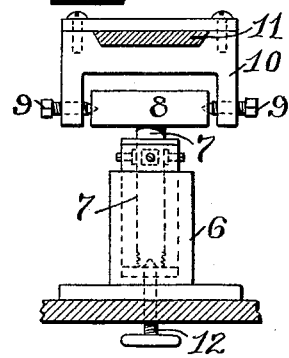
Figure 7:
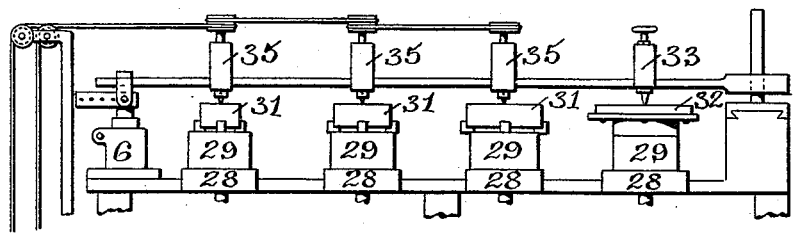
Figure 8:
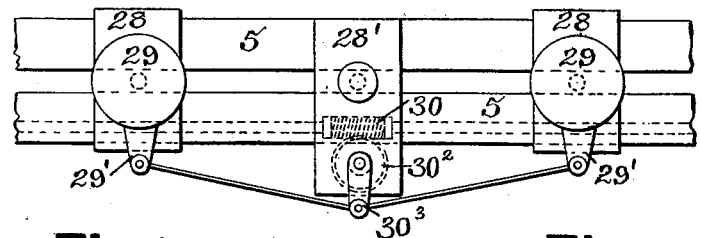
Figure 9:
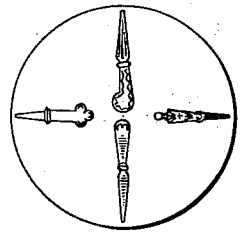
Figure 10:
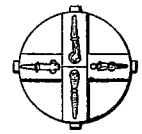

Figure 1 is a side view of my improved milling-machine. Fig. 2 is a top view of the same. Fig. 3 is an end view, partly in section, of the traversing carriage showing the automatic reversing-clutch and operating-connections partly in broken lines. Fig. 4 is an enlarged view, partly in section, of the pivotal connection of the way-bar with the traversing-slide. Fig. 5 is a side view of the milling-tool carriage. Fig. 6 is an end view of the pivotal support of the way-bar. Fig. 7 is a side view of part of my improved machine showing three milling tools and a stylus, or tracer, secured to the way-bar, arranged to multiply the pattern on a reduced scale. Fig. 8 is a plan view, partly shown in broken lines, of an attachment by which oscillating motion is imparted to the chucks or die-holders. Fig. 9 is a top view of a pattern-disk, and Fig. 10 is a top view of a chuck adapted to secure four dies.

Similar numbers of reference indicate corresponding parts throughout.

In the drawings the numbers 3 indicate the end frames, and 4 the middle frame; these frames form the supports of the machine, they extend transversely to the bed-plate 5, which is secured to the top of these frames, and to secure the required rigidity the frames 3 and 4 have bases considerably longer than the width of the bed-plate. The bed-plate 5 is provided with a central, longitudinal opening to facilitate the securing of the chuck-carriages by a central bolt in the manner usual with lathes, planers and milling-machines. On the left-hand end of the bed-plate 5 is secured the standard 6 in which the spindle 7 turns,—this spindle 7 is provided at its upper end with the plate 8 on the two opposite sides of which a number of conical holes is made in which the points of the screws 9 enter so as to secure the yoke 10 pivotally to the plate 8,—to the yoke 10 the end of the way-bar 11 is firmly secured. To reduce the friction and also to permit of the vertical adjustment of the spindle 7, the screw 12, provided with a hand-wheel, is threaded into the bottom of the standard 6, the pointed end of this screw 12 forming the vertical support of the spindle 7. The standard 6 and the parts above referred to as connected therewith are all shown on an enlarged scale in Fig. 6.

In this machine the successful milling of dies, or other similar articles, requires that the way-bar, on which the tracer and one or more milling-tools are supported, shall be firmly held at one end, so as to prevent jars, or tremors, and yet be free to swing horizontally as well as vertically. The weight of the way-bar with the milling-tools and tracer requires to be supported by a counterbalance weight, or equivalent means, to prevent excessive pressure of the stylus, or tracer, on the pattern. The end of the way-bar opposite the end where it is pivoted in the standard 6 must be moved horizontally so as to carry the milling tool or tools and the tracer preferably across the surface of the pattern or the piece to be cut, although on most of the work a movement across one-half of the surface, namely from the center to the periphery is sufficient to completely cut one or more duplicates. The next essential is to secure the positive turning of the pattern and the work at such a speed that the milling tool or tools can cut the metal as fast as the same is fed up to it, and, as the feed of a revolving-disk to the milling-tool increases as the milling-tool moves from the center toward the periphery and decreases when it is moved toward the center, it is essential that the revolution of the pattern and the work be accelerated as the milling-tool moves toward the center and retarded when the milling-tool moves toward the periphery or away from the center.

I have above described the pivotal support of the way-bar 11 in the standard 6 at the left-hand end of the machine; this way-bar 11 is formed the greater portion of its length of two ways on which the carriages supporting the milling-tools and the carriage supporting the stylus are firmly supported, so that the milling-tool and the stylus extend down through the space between the two sides of the way-bar. The end of the way-bar on the right hand of the machine, as shown in Figs. 1 and 2, is supported by the balance-weight which is secured to a strap, or chain, that extends from the weight 13 over the pulley 14 and has the opposite end secured to the end of the way-bar 11. The weight 13 does not support the way-bar but counterbalances the same sufficiently to relieve the stylus from excessive weight. This end of the way-bar 11 is provided with a rectangular opening in which the rollers 15 and 16 are journaled and adjusted to bear on the spindle 17,—in Fig. 4 this arrangement is shown enlarged, the roller 15 is journaled in fixed bearings and the roller 16 in a slide so that it can be adjusted against the spindle 17 by the thumb-screw 16'. The spindle 17 is secured to the slide-carriage 18 connected with the transverse-head 19 by a dove-tail sliding connection. The screw 20, which is journaled at the opposite ends in the transverse-head 19 and has the hand-crank 21 secured to one end, extends through a threaded-nut secured to, or formed in, a projection of the slide-carriage 18 so that by turning the screw a sliding motion is imparted to the sliding-carriage 18. To move the sliding-carriage and with the same the end of the way-bar 11 automatically by power, the beveled-gears 22 and 23 are mounted loosely on the shaft of the screw 20, and the clutch 24, both ends of which have the usual clutch-connections for engagement with the beveled-gears 22 and 23, is connected with the shaft of the screw 20 by a sliding tongue and groove connection. The weighted shipper-arm 25 is pivoted at its lower end and connected with the clutch 24, so that by swinging this arm in one or the other direction the clutch 24 will connect with one of the beveled-gears 22 or 23 and as these gears are driven, each by a small bevel-gear, in opposite directions the screw 20 will be turned in one or the opposite direction. The shipper-arm 25 is operated by the rod 26 pivotally secured to said shipper-arm and provided with the adjustable tappets 26 which, when the sliding-carriage approaches the end of its traverse, come in contact with a projection of the carriage and then exert a strain on the shipper-arm by which it is moved to and a little beyond the perpendicular position,—the weighted end now descends and by this sudden motion disconnects the clutch 24 from one and connects the same with the other of the beveled-gears 23 or 22 and thus reverses the rotary motion of the screw and the sliding motion of the carriage 18 and with it the movement of the end of the way-bar 11.

The carriages 28 are formed to fit on the bed-plate 5 so as to slide on the same to be adjusted and are then firmly secured to the bed-plate,—they form the supports for the chucks 29 and are provided with journal-bearings in which the vertical shafts of the chucks turn, the lower ends of these shafts are provided with worm-gears and these worm-gears engage with the worms 30 secured to the shaft 30'. The work 31 and the pattern 32 are each secured to and turn with one of the chucks 29 and all the chucks turn in the same direction and make the same number of revolutions in the same time. The stylus, or tracer, is supported in the standard 33 which is grooved at its lower face so as to set down over the two ways of the way-bar 11. The clamp-piece 34 is firmly clamped to the two ways of the way-bar 11 and is connected with the standard 33 by an adjusting-screw, so that the stylus may be accurately adjusted and then firmly secured. The milling-tool is journaled in the standard 35 supported on a slide and provided with a clamp 34 and adjusting-screw like the standard 33, so that it may be accurately adjusted on and secured to the ways of the way-bar 11. The milling-tool standard is shown enlarged in Fig. 5 and is provided with a vertical adjustment by which the milling-tool can be adjusted with great nicety. The portion 35' of the standard 35, which forms the bearing for the vertical milling-spindle, is connected with the fixed part $35^2$ by a dovetail slide connection, and a projecting portion of the part 35' is connected by a screw-thread engagement with a vertical screw of fine micrometer threads on the upper end of which is the milled-head 36 provided with a graduated disk and this disk turns within a graduated vernier circle. By turning the head 36 in one direction the milling-tool will be raised, while when turning the same in the opposite direction it will be lowered,—this movement can be made within one one-thousandth part of an inch in the same manner as the movement of a micrometer-screw is adjusted.

Each milling-tool spindle is provided with a whirl 37 over which the band for driving the spindle passes; they may be provided with two whirls when more than one milling-tool is to be used, as indicated in Fig. 7.

As the milling-spindles run at high speed, thorough lubrication is essential. I have shown the oil-cup 38 placed above the upper bearing of the spindle above the whirl, they may, however, be placed below the whirl.

In the modification shown in Fig. 8, when it is desired to concentrate the working of the milling-tool on a portion of the disk only, I place midway between the two carriages 28 supporting the two chucks 29, one for holding the pattern and one for holding the work, the carriage 28' which projects on one side sufficiently beyond the bed-plate 5 to form a journal-support for the worm-gear $30^2$ arranged to engage with the worm 30, and secure to the shaft of the worm-gear $30^2$ the crank-arm $30^3$, and onto the chucks 29 I secure, or form, the arms 29' and connect the crank-arm $30^3$ with the arms 29' by connecting-rods, so that, as the worm-gear $30^2$ and crank-arm $30^3$ revolve, oscillating motion is imparted to the chucks 29.

Motion is imparted to this machine by connecting the pulleys 40 with some prime motor, or revolving pulley, thus imparting rotary motion at the desired speed to the shaft 41, the band-wheel 42 and the double-cone 43. From the band-wheel 42 the motion is transmitted to the milling spindle, or spindles, by leading the belt, or band, over suitable pulleys and providing the same with a weighted tightening pulley, as is shown in Fig. 1. The motion from the double-cone pulley 43 is transmitted to the double-cone 44 by a belt which passes through the shipper 45 and from the shaft of the cone-pulley 44, by the gear 46, through the intermediate-gear 47 to the gear 48 on the worm-shaft 30' and through the worms 30 and their corresponding worm-gears to the chucks 29. The shipper 45 is connected to the weight 45' by means of a strap, or chain, and also to the slide-carriage 18 by a strap or chain passing over suitable pulleys so as to transmit the motion of the slide-carriage 18 and the moving end of the way-bar 11 to the shipper, so that by leading the belt connecting the cone-pulleys the speed transmitted to the worm-shaft 30' is increased as the belt approaches the centers of the cone-pulleys and is diminished as the belt moves toward either of the ends of the cone-pulleys. The motion for operating the slide-carriage 18 and with it the end of the way-bar 11 is transmitted from worm-gear $30^4$ secured to the shaft of the clutch 29 to which the pattern 32 is secured and which is driven by the worm 30, as is shown in Fig. 3, by securing to this worm-gear $30^4$ the gear $30^5$ and connecting the same with the gear $30^7$ by the gear $30^6$. To the other end of the shaft of the gear $30^7$ a small cone-gear is secured meshing with the cone-gear 23 and underneath the small cone-gear a spur-gear transmits the motion to an intermediate gear and this to another gear to the upper side of which another small cone-gear is secured meshing with the cone-gear 22. By thus driving the worm-shaft 30' and the screw-shaft 20 by gearing, which being cut and made in the most approved manner, all slipping, or backlash, is avoided and better work is secured.

Having thus described my invention, I claim as new and desire to secure by Letters Patent—

1. In a milling-machine, the combination with two carriages provided with chucks, or supporting bases, for the pattern and the work, and mechanism for rotating the same, of the way-bar 11 pivotally supported at one end and connected with a traversing spindle on the other end, a stylus or tracer and a milling-tool supported on the two ways of the way-bar, the tracer and milling-spindle located in the center of the way-bar, and mechanism for operating the milling-tool and traversing the way-bar, as described.

2. In a milling-machine, the combination with a milling-tool, and a stylus or tracer supported centrally on a way-bar having capacity for vertical and horizontal motion, of the spindle 7 and spindle 17 both placed on a line with the center of the way-bar and on a straight line with the axes of the milling-spindle and stylus, and mechanism for supporting and rotating the pattern and the work and traversing the way-bar, as described.

3. In a milling-machine, the combination with the supporting frames and the bed-plate having a slot extending lengthwise, carriages adapted to slide on the bed-plate, chucks, for supporting the pattern and the work, journaled in the carriages, worm-wheels secured to the shafts of the rotatable chucks and engaging with the worms on the driving-shaft, of the standard 6 forming the support for the spindle 7 and plate 8, the slotted way-bar connected to the plate 8 by means of the yoke 10, the slotted way-bar 11, a milling-tool adjustably supported between the two ways of the way-bar, a stylus or tracer also supported on the way-bar between the two ways, the transverse moving slide-carriage 18 and spindle 17, and mechanism for rotating the pattern, the work and the milling-tool and traversing the free end of the way-bar, as described.

4. In a milling-machine, the combination with the chucks for supporting the work and the pattern, the worm-gears secured to the chucks, the worms 30, the slotted way-bar 11 pivotally secured at one end and adapted to move vertically and horizontally, the weight 13 for partially supporting the free end of the way-bar, and the milling-tool and stylus adjustably connected with and supported by the way-bar, of the main driving-shaft 41, the band-wheel 42 and connections with the milling-spindle, the cone-pulleys 43 and 44 connected by a driving-belt, and the gears 46, 47 and 48 arranged to transmit the motion of the main driving-shaft to the pattern, the work and the milling-spindle, as described.

5. In a milling-machine, the combination with the rotating supports for the work and the pattern, and a milling-tool and stylus supported on a longitudinally-slotted way-bar pivoted at its longitudinal center on one end and connected with a traversing spindle at the other end, of the transverse-head 19 provided with slides, the carriage 18 supporting the spindle 17, the screw 20, a clutch connected with the screw-shaft, and the gears $30^4$, $30^5$, $30^6$, the beveled-gears 22 and 23 and intermediate-gears for transmitting the motion of the worm 30 to the screw 20 to turn the same in one or the opposite direction to traverse the stylus and the milling-tool, as and for the purpose described.

6. In a milling-machine, the combination with the journaled work and pattern holders, and the milling-tool and stylus supported on the way-bar pivotally secured at one end and traversed at the opposite end, as described, of the slide-carriage 18 supporting the spindle 17, the screw 20 connected by a screw-threaded connection with the slide-carriage, the beveled-gears 22 and 23 and the gears for operating the same, the clutch 24, the weighted shipper-arm 25, and the rod 26, connected with the shipper-arm, provided with the adjustable-tappets 27, adapted to disconnect the clutch from one beveled-gear and connect it with the other so as to reverse the motion of the screw and slide-carriage, as described.

7. In a milling-machine, the combination with the journaled supports 29 each provided with an arm 29′, and the worm 30, of the worm-gear $30^2$, the crank-arm $30^3$, and two connecting-rods, connecting the crank-arm $30^3$ with the arms 29′, adapted to impart a partial rotation to the work and pattern, secured to the support 29, as and for the purpose described.

8. In a milling-machine, the combination with the standard 6, the spindle 7 mounted therein, the cross plate or bar 8 secured to the spindle, the yoke 10 pivotally secured to the cross plate, and the way-bar 11 secured in the yoke, of the screw 12 working in a vertical perforation in the standard 6, adapted to adjust the vertical position of the way-bar and form the support for the spindle, as described.

9. In a milling-machine adapted to mill a number of dies of varying size simultaneously and automatically from one pattern, the combination with a series of rotatable work-holders and a rotatable pattern-holder, of a stylus or tracer, and a series of milling-tools supported on a way-bar pivotally connected at one end and connected with a traversing spindle at the other end so that the axes of the pivotal connection, the milling-tools, the stylus and the traversing spindle are all on one straight line and adapted to move vertically as well as horizontally as the stylus is moved over the pattern to reproduce the pattern, as described.

ERNEST MEYERS.

Witnesses:
JOSEPH A. MILLER,
HENRY J. MILLER.